United States Patent
Reboul et al.

(10) Patent No.: US 12,528,593 B2
(45) Date of Patent: Jan. 20, 2026

(54) NACELLE FOR AN AIRCRAFT PROPULSION UNIT, COMPRISING A SAFETY ROD FORMING A STRUCTURAL REINFORCEMENT

(71) Applicant: SAFRAN NACELLES, Gonfreville-l'Orcher (FR)

(72) Inventors: Pierre-Alain Reboul, Moissy-Cramayel (FR); Hazem Kioua, Moissy-Cramayel (FR); Thomas Marlay, Moissy-Cramayel (FR); Ophélie Schmitter, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/250,638

(22) PCT Filed: Nov. 2, 2021

(86) PCT No.: PCT/FR2021/051916
§ 371 (c)(1),
(2) Date: Apr. 26, 2023

(87) PCT Pub. No.: WO2022/090676
PCT Pub. Date: May 5, 2022

(65) Prior Publication Data
US 2023/0382545 A1 Nov. 30, 2023

(30) Foreign Application Priority Data
Nov. 2, 2020 (FR) ........................ 2011205

(51) Int. Cl.
*B64D 29/06* (2006.01)
*B64D 27/40* (2024.01)

(52) U.S. Cl.
CPC ........... *B64D 29/06* (2013.01); *B64D 27/402* (2024.01)

(58) Field of Classification Search
CPC ................................ B64D 29/08; B64D 29/06
See application file for complete search history.

(56) References Cited

U.S. PATENT DOCUMENTS

| 4,399,966 A | * | 8/1983 | Crudden | ................. | B64D 29/08 244/129.4 |
| 4,585,189 A | * | 4/1986 | Buxton | ................. | B64D 29/00 49/113 |

(Continued)

FOREIGN PATENT DOCUMENTS

| FR | 2873988 A1 | 2/2006 |
| FR | 2920177 A1 | 2/2009 |

(Continued)

OTHER PUBLICATIONS

International Search Report for issued in Application No. PCT/FR2021/051916 dated Feb. 16, 2022.
Written Opinion for PCT/FR2021/051916 dated Feb. 16, 2022.

*Primary Examiner* — Ashesh Dangol
(74) *Attorney, Agent, or Firm* — McDonald Hopkins LLC

(57) ABSTRACT

A nacelle for an aircraft propulsion unit, includes at least one safety rod capable of holding a cowl open when the rod is placed in a holding position. The rod is configured so that it can be arranged, by moving at least one of its ends, in a flight position so as to fulfill a structural reinforcement function when the cowl is closed.

5 Claims, 7 Drawing Sheets

(56) References Cited

U.S. PATENT DOCUMENTS

| | | | | |
|---|---|---|---|---|
| 6,227,485 B1* | 5/2001 | Porte | ............... | B64D 29/08 |
| | | | | 244/54 |
| 2004/0238687 A1* | 12/2004 | Jones | ............... | F02K 1/64 |
| | | | | 244/62 |
| 2018/0351243 A1* | 12/2018 | Lewis | ............... | H01Q 1/282 |

FOREIGN PATENT DOCUMENTS

| | | | |
|---|---|---|---|
| FR | 3025556 A1 | 3/2016 | |
| FR | 3040044 A1 | 2/2017 | |
| FR | 3075176 A1 | 6/2019 | |

* cited by examiner

NACELLE FOR AN AIRCRAFT PROPULSION UNIT, COMPRISING A SAFETY ROD FORMING A STRUCTURAL REINFORCEMENT

This is the National Stage of PCT international application PCT/FR2021/051916, filed on Nov. 2, 2021 entitled "NACELLE FOR AN AIRCRAFT PROPULSION UNIT, COMPRISING A SAFETY ROD FORMING A STRUCTURAL REINFORCEMENT", which claims the priority of French Patent Application No. 2011205 filed Nov. 2, 2020, both of which are incorporated herein by reference in their entireties.

TECHNICAL FIELD

The invention relates to the field of propulsion units for aircrafts.

Prior Art

An aircraft propulsion system needs to be inspected, maintained and/or repaired on a regular basis.

To this end, a conventional propulsion unit comprises fan cowls hinged on hinges allowing placing them in an open position in which they clear a space for access to the engine.

Safety connecting rods, known by the acronym "HOR" standing for "Hold Open Rod", are generally intended to hold the cowls in the open position, for example as described in the document FR 3 025 556 A1.

Such safety connecting rods increase the mass of the propulsion unit.

DISCLOSURE OF THE INVENTION

The invention aims to provide a nacelle for an aircraft propulsion unit allowing holding the cowls of the nacelle in the open position while reducing the mass formed by elements that are inoperative in flight.

To this end, an object of the invention is a nacelle for an aircraft propulsion system, comprising the features of claim 1.

Thus, the connecting rod forms a means for holding the cowl in the open position, i.e. a safety connecting rod, allowing improving the structural strength of the nacelle and the distribution of the loads within the propulsion unit and the aircraft in flight.

Compared to a conventional nacelle, the safety connecting rod of the invention consequently features a useful mass in flight.

Preferably, the cowl comprises connecting means configured to cooperate with the connecting rod in the maintenance position, the connecting rod in the flight position being detached from these connecting means.

In the present description, it is considered that the first component is distinct from the second component.

As indicated hereinabove, the second component may be a component of the nacelle or, alternatively, a component formed by another portion of the aircraft, i.e. a component not belonging to the nacelle.

In one embodiment, the nacelle comprises an air inlet, a gas ejection rear section, and a cradle, the cradle extending longitudinally between the air inlet and the rear section and supporting the air inlet and/or the rear section, the cradle comprising attachment means configured to cooperate with the connecting rod in the flight position, the connecting rod in the maintenance position being detached from these attachment means.

For example, the first component is formed by an air inlet or by a gas ejection rear section of the nacelle.

The invention also relates to a propulsion unit for an aircraft comprising a turbine engine and a nacelle as defined hereinabove.

In one embodiment, the connecting rod in the maintenance position is fastened to the turbine engine.

The invention also relates to an aircraft comprising such a propulsion unit or such a nacelle.

In one embodiment, the aircraft comprises a wing or fuselage or empennage element forming said second component.

According to another aspect, the invention also relates to a method for inspecting and/or maintaining a propulsion unit as defined hereinabove.

Preferably, this method comprises a step of moving the cowl from the closed position to the open position and a step of moving the connecting rod from the flight position to the maintenance position.

Other advantages and features of the invention will appear upon reading the detailed, non-limiting description that follows.

BRIEF DESCRIPTION OF THE DRAWINGS

The following detailed description refers to the appended drawings wherein.

DETAILED DESCRIPTION OF SOME EMBODIMENTS

FIGS. 1 to 15 comprise a reference frame X, Y and Z respectively defining axial (or longitudinal), vertical and lateral directions that orthogonal to one another.

Figure 1:
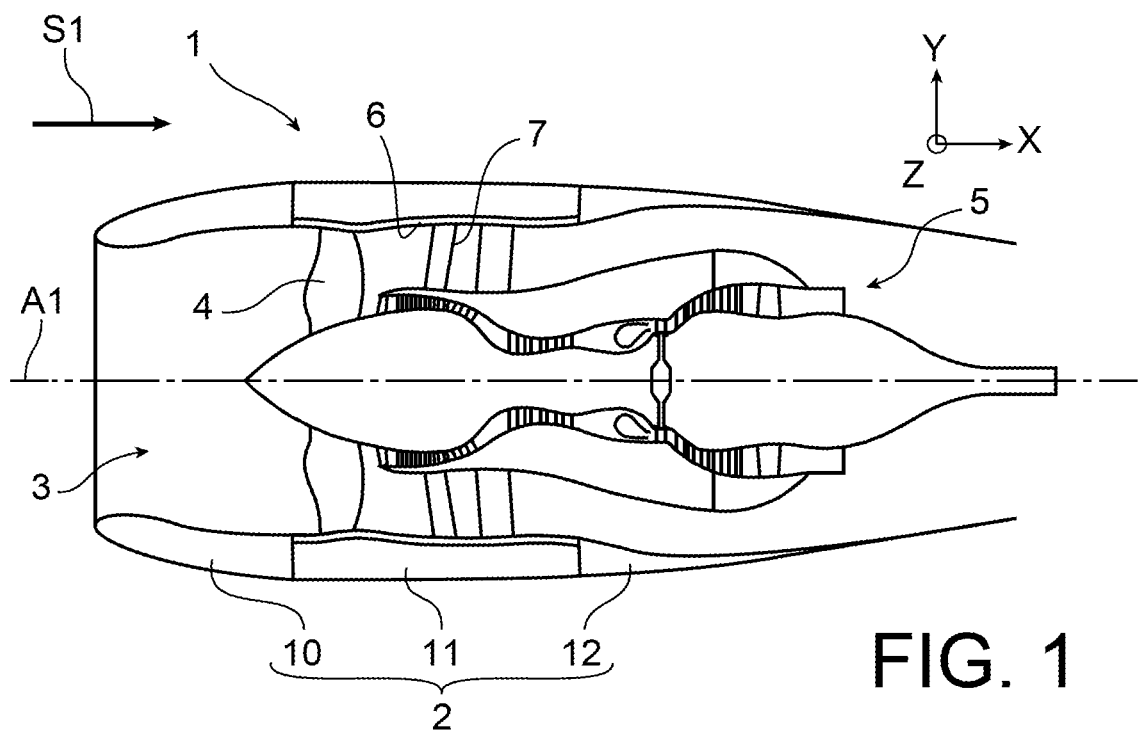
FIG. 1 is a schematic view of an aircraft propulsion unit.

A propulsion unit 1 for an aircraft is represented in FIG. 1, having a longitudinal central axis A1 parallel to the axial direction X.

The propulsion unit 1 comprises a nacelle 2 and a turbine engine 3.

In this example, the turbine engine 3 is a turbofan engine comprising, in a manner known per se, a fan 4, a gas generator 5 and an outer casing 6 connected to the gas generator 5 by structural arms 7.

The longitudinal central axis A1 forms an axis of rotation of a rotor of the turbine engine 3.

The outer casing 6 of the turbine engine 3 extends axially forward of the propulsion unit 1 so as to surround the fan 4.

Throughout the description, the terms "front" and "rear" are defined with respect to a direction S1 of gas flow through the propulsion unit 1 according to the axial direction X.

In a manner known per se, the nacelle 2 comprises, from the front to the rear, a front section 10 forming an air inlet, an intermediate section 11 comprising fan cowls (cf. hereinbelow), and a gas ejection rear section 12.

In this example, the rear section 12 is a fixed shroud. In another embodiment, the rear section 12 comprises a thrust reverser (not represented).

Figure 2:
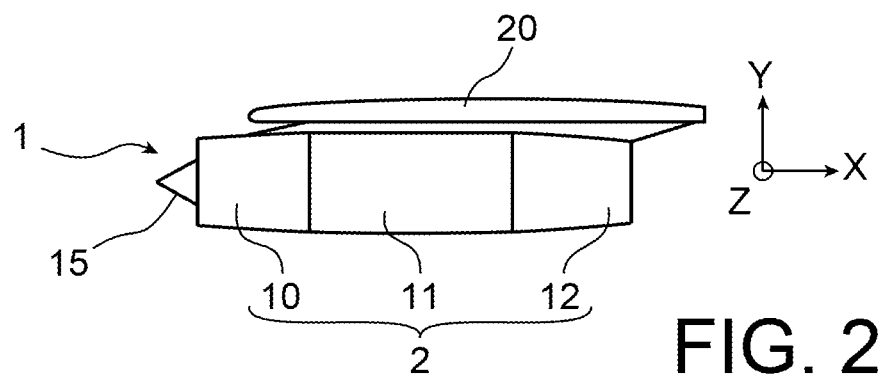
FIG. 2 is a schematic view of a propulsion unit mounted under an aircraft wing.
Figure 3:
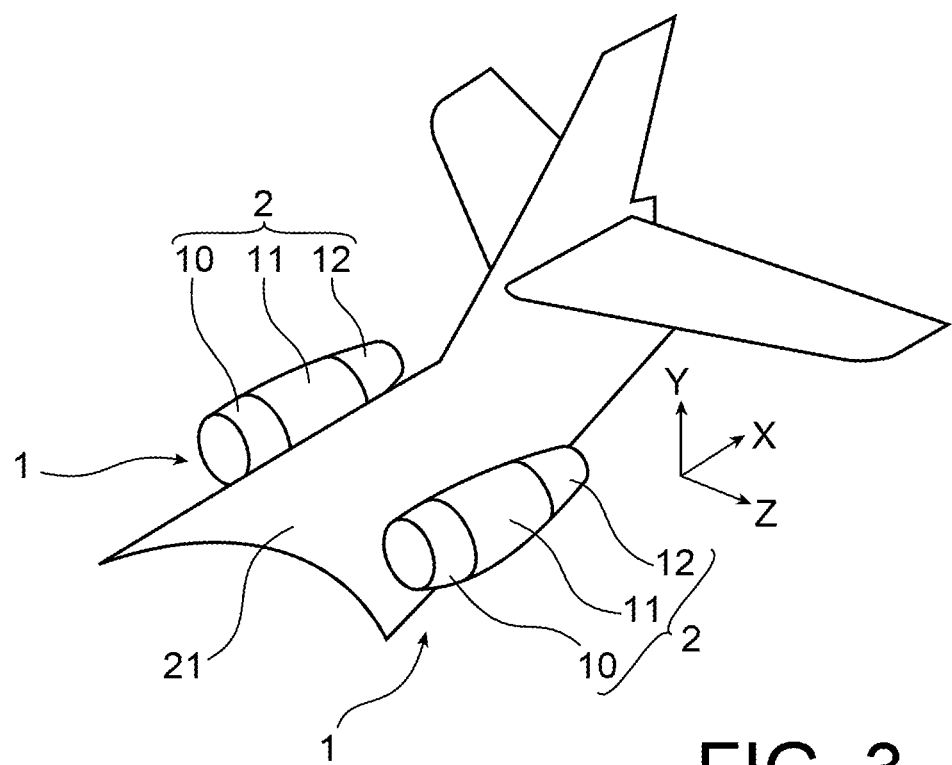
FIG. 3 is a schematic view of two propulsion units mounted laterally at the rear portion of an aircraft fuselage.
Figure 4:
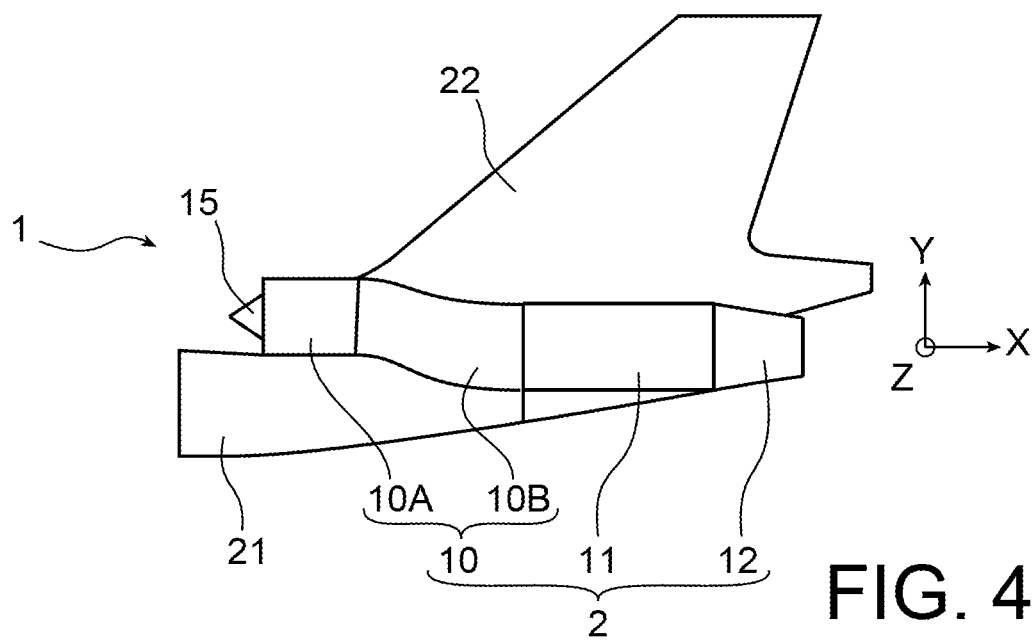
FIG. 4 is a schematic view of a propulsion unit mounted at the rear portion of an aircraft fuselage, under an empennage of this aircraft.

FIGS. 2 to 4 illustrate different conventional mounting configurations of such a propulsion unit 1.

FIG. 2 shows a propulsion unit 1 mounted vertically under a wing 20 of an aircraft.

FIG. 3 shows two propulsion units 1 mounted on a fuselage 21 of an aircraft, laterally and at the rear portion of the fuselage 21.

FIG. 4 shows a propulsion unit 1 mounted on a fuselage 21 of an aircraft, in the continuation of the fuselage 21 according to the longitudinal direction X and extending vertically under an empennage 22 of the aircraft.

In these examples, the propulsion units 1 illustrated in FIGS. 2 to 4 are similar to that of FIG. 1.

In the configuration of FIG. 4, the air inlet 10 comprises an air intake section 10A and an "S"-shaped section 10B connecting together the section 10A and the intermediate section 11 of the nacelle 2.

In each of the configurations of FIGS. 2 and 4, the propulsion unit 1 further comprises an inlet cone 15 allowing slowing down the airflow entering the air inlet 10.

The nacelle 2 and the turbine engine 3 of the propulsion unit 1 are supported by a support structure described in more detail hereinbelow.

In the configuration of FIG. 2, the support structure forms a portion of a framework of the wing 20.

In the configuration of FIG. 3, the support structure forms a portion of the fuselage 21.

In the configuration of FIG. 4, the support structure forms a portion of the empennage 22.

The invention is applicable to each of the configurations of FIGS. 2 to 4 and to variants of these configurations. For example, the invention may also be implemented in a propulsion unit 1 without an inlet cone and mounted according to the configuration of FIG. 2 or 4, or else in a propulsion unit 1 including an inlet cone and mounted according to the configuration of FIG. 3.

In addition, the invention also applies to a propulsion unit whose turbine engine is different from that illustrated in FIG. 1. Without limitation, the turbine engine may be a simple or double-flow turbojet engine and comprising, or not, a post-combustion.

By convention, it is considered in the present description that the support structure belongs to the propulsion unit 1.

Figure 5:
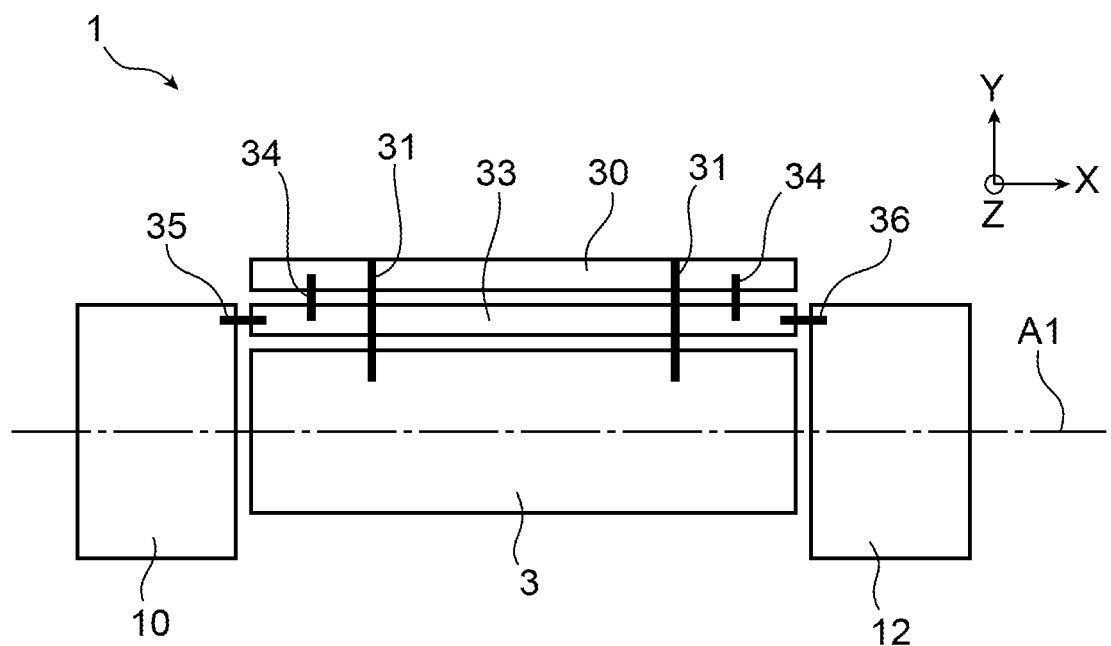
FIG. 5 is a schematic view of a propulsion unit comprising a turbine engine and a nacelle which are supported independently of each other by a support structure.

The invention is particularly interesting for a propulsion unit 1 having an architecture as illustrated in FIG. 5. Nonetheless, the invention may be implemented within a propulsion unit having a conventional architecture or an architecture different from that of FIG. 5 (cf. further below).

The propulsion unit 1 of FIG. 5 comprises a support structure 30 which in this example forms a portion of the wing framework 20, according to the configuration of FIG. 2.

The following description applies by analogy to each of the configurations of FIGS. 3 and 4 and more generally to any configuration identical or similar to any one of the configurations of FIGS. 2 to 4.

Referring to FIG. 5, the turbine engine 3 is connected to the support structure 30 by first connecting means 31.

In this example, the first connecting means 31 comprise suspension arms configured to support the turbine engine 3.

Moreover, the propulsion unit 1 of FIG. 5 comprises an intermediate support structure 33 fastened to the support structure 30 by fastening members 34.

In this example, the intermediate support structure 33 forms a portion of the intermediate section 11 of the nacelle 2 meaning that it extends axially between the air inlet 10 and the rear section 12 of the nacelle 2.

In this example, each of the air inlet 10 and the rear section 12 is connected to the intermediate support structure 33 by connecting means 35 and 36, respectively.

The intermediate support structure 33 and the connecting means 35 and 36 form second connecting means, distinct from the first connecting means 31.

This architecture enables the support structure 30 to support on the one hand the turbine engine 3 via the first connecting means 31 and on the other hand the air inlet 10 and the rear section 12 of the nacelle 2 via the second connecting means.

In other words, the turbine engine 3 on the one hand and the air inlet 10 and the rear section 12 of the nacelle 2 on the other hand are supported by the support structure 30 independently.

In comparison with a conventional propulsion unit in which the air inlet and the rear section of the nacelle are supported by the turbine engine, the architecture of the propulsion unit of FIG. 5 allows reducing the mass of the turbine engine 3, the latter could henceforth be devoid of flanges for fastening the air inlet 10 and the rear section 12, and allows avoiding generating considerable loads on the turbine engine 3 and thus affecting its dynamic behaviour.

Of course, the second connecting means may be devoid of such an intermediate support structure 33 and the air inlet 10 and/or the rear section 12 of the nacelle 2 may be fastened directly to the support structure 30.

Thus, the following different categories of embodiments could be distinguished in particular. According to a first category of embodiments, the air inlet 10 and the rear section 12 are connected to the intermediate support structure 33. According to a second category of embodiments, the air inlet 10 is connected to the intermediate support structure 33 whereas the rear section 12 is directly connected to the support structure 30.

According to a third category of embodiments, the rear section 12 is connected to the intermediate support structure 33 whereas the air inlet 10 is directly connected to the support structure 30. According to a fourth category of embodiments, the air inlet 10 and the rear section 12 are connected directly to the support structure 30.

The intermediate support structure 33 of FIG. 5 may have any geometry suitable for supporting the air inlet 10 and/or the rear section 12. For example, the intermediate support structure 33 may form a beam, a box, a cradle, a lattice structure or any other structure capable of connecting the air inlet 10 and/or the rear section 12 to the support structure 30.

Figure 6:
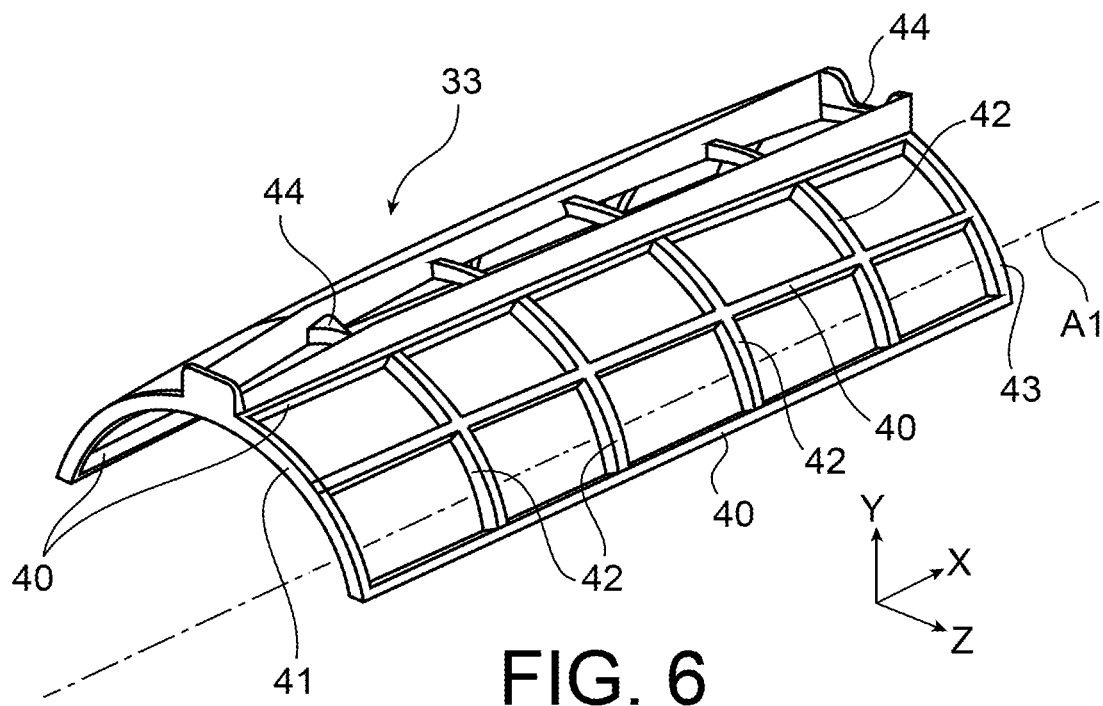
FIG. 6 is a schematic view of a nacelle support cradle for a propulsion unit having an architecture in accordance with FIG. 5.

In one embodiment, the intermediate support structure 33 forms a cradle as illustrated in FIG. 6.

The cradle 33 comprises spars 40 and ring sections 41, 42 and 43 connected together so as to form a lattice structure.

Such a structure is both robust and barely heavy.

In this example, the cradle 33 comprises six spars 40 extending parallel to the axial direction X and being circumferentially spaced apart from each other, as well as six ring sections 41, 42 and 43 spaced apart from each other along the axial direction X.

The cradle of FIG. 6 has a plane of symmetry Z-X passing through the longitudinal central axis A1, three of said spars 40 extending on one side of this plane of symmetry and the other three spars 40 extending on the other side of this plane of symmetry.

The cradle 33 also comprises a hooking structure 44 configured to cooperate with said fastening members 34 so as to fasten the cradle 33 on the support structure 30 (cf. FIGS. 5 and 6).

The ring section 41 is located at one of the axial ends of the cradle 33 and forms a front frame. The ring section 43 is located at the other axial end of the cradle 33 and forms a rear frame. The ring sections 42 extend axially between the front frame 41 and the rear frame 43.

When the cradle is fastened to the support structure 30 of the propulsion unit 1, the ring sections 41, 42 and 43 and therefore the cradle 33 in its entirety extend circumferentially around the longitudinal central axis A1.

In this example, the cradle 33 has a circumferential dimension smaller than 180°, this dimension being in this case defined by the circumferential dimension of each of the ring sections 41, 42 and 43.

Figure 7:
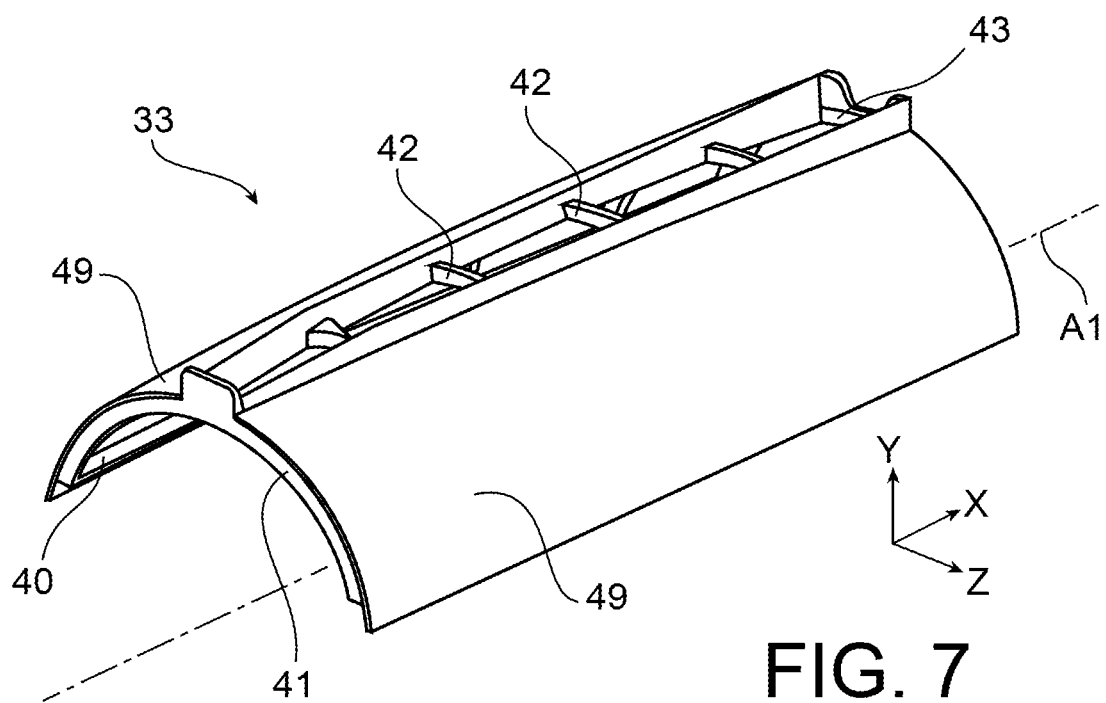
FIG. 7 is a schematic view of the cradle of FIG. 6 covered with outer skins.

FIG. 7 shows the cradle 33 partially covered with outer skins 49 forming a fairing.

Referring to FIGS. 5 and 6, the air inlet 10 of the nacelle 2 is in this example mounted cantilevered on the cradle 33, while being connected to the front frame 41 of the cradle 33 by the connecting means 35.

Similarly, the rear section 12 of the nacelle 2 is in this example mounted cantilevered on the cradle 33, while being connected to the rear frame 43 of the cradle 33 by the connecting means 36.

In this embodiment, the air inlet 10 and the rear section 12 of the nacelle 2 are in axial support, or capable of coming into axial support, respectively on the front frame 41 and the rear frame 43 of the cradle 33, i.e. over a circumferential sector of less than 180°.

In other non-represented embodiments, the front frame 41 and/or the rear frame 43 of the cradle 33 are annular so that the air inlet 10 and/or the rear section 12 are mounted over their entire circumference in axial support on the cradle 33.

In this example, the suspension arms 31 of the turbine engine 3 pass through openings formed by the cradle 33 (cf. FIGS. 5, 6 and 8), i.e. openings delimited axially by two respective ring sections and by two respective spars of the cradle 33.

The concept consisting in making the intermediate support structure 33, and more generally the second connecting means, pass through the first connecting means 31 is also applicable to an intermediate support structure having a geometry different from that of the cradle of FIG. 6. For example, in one embodiment in which the intermediate support structure is a beam, openings may be formed in the beam so that the first connecting means could extend through these openings (not represented).

Figure 8:
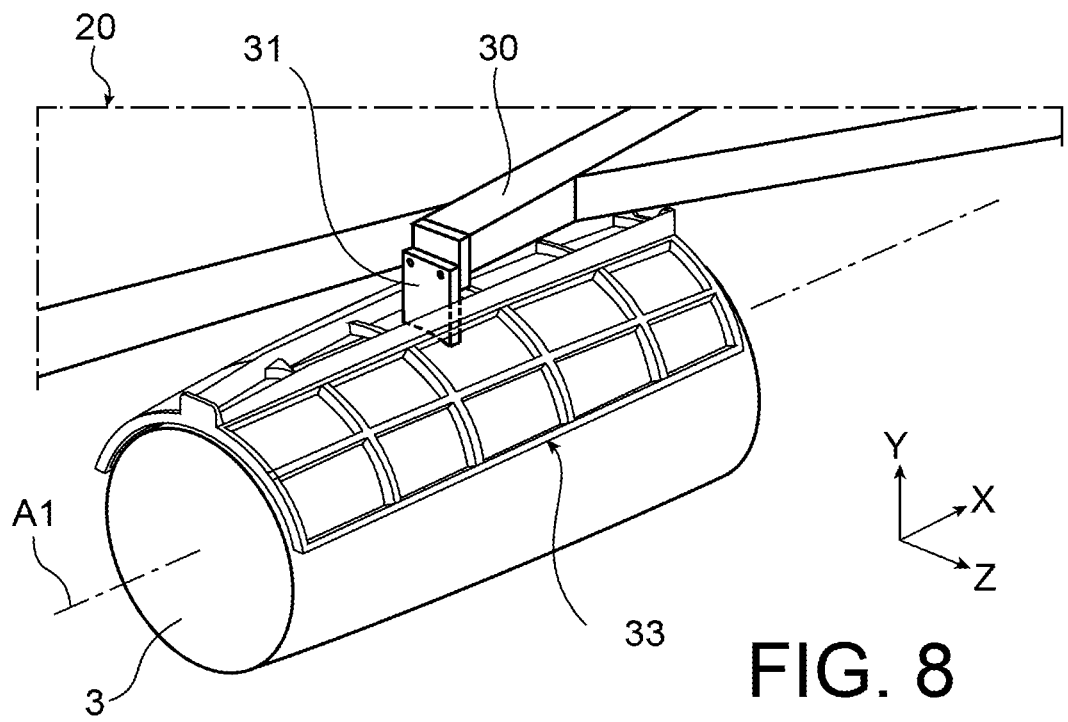
FIG. 8 is a schematic view of an aircraft wing framework under which the cradle of FIG. 6 and a turbine engine are suspended in accordance with the architecture of FIG. 5.

FIG. 8 shows an aircraft portion including a propulsion unit 1 having the architecture of FIG. 5 and comprising as an intermediate support structure 33 the cradle of FIG. 6.

More specifically, FIG. 8 shows a framework 30 of an aircraft wing 20, the cradle 33 and the turbine engine 3 fastened to the framework 30 by the suspension arms 31 (only one arm being visible in this figure). The members 34 for fastening the cradle 33 on the framework 30 are not visible in FIG. 8.

Figure 9:
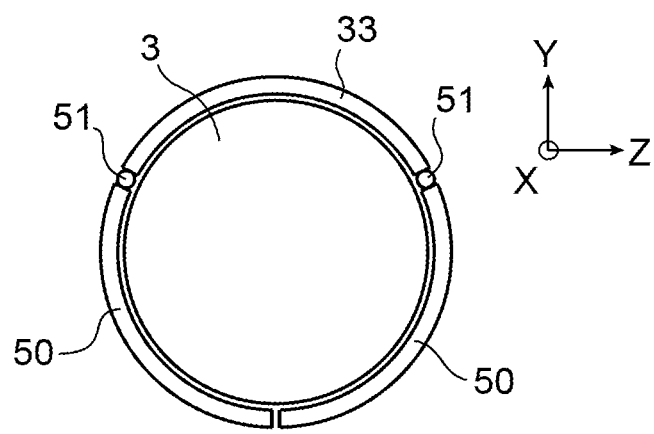
FIG. 9 is a schematic view of a propulsion unit comprising the cradle of FIG. 6 and two fan cowls in a closed position.
Figure 10:
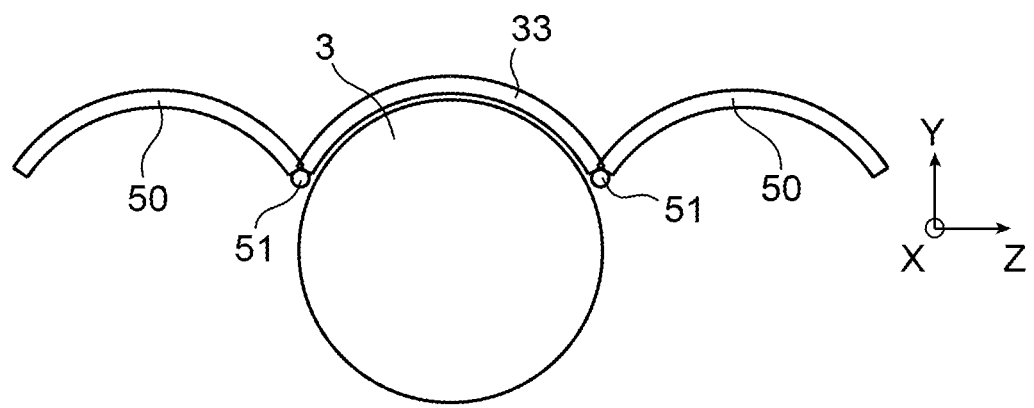
FIG. 10 is a schematic view of the propulsion unit of FIG. 9, the fan cowls being in an open position.

FIGS. 9 and 10 schematically show fan cowls 50 each connected to a structure of a propulsion unit 1 according to a pivot connection 51 enabling them to be moved between a closed position (FIG. 9) and an open position (FIG. 10).

In this example, the propulsion unit 1 has an architecture as represented in FIG. 5 and the structure to which the cowls 50 are connected is the cradle 33 of FIG. 6. In alternative embodiments, the cowls 50 are connected to the support structure 30 of a propulsion unit 1 such as that of FIG. 5 or to another structure of a propulsion unit or of an aircraft having an architecture which may be similar to or different from that of FIG. 5. The following description applies by analogy to these alternative embodiments.

In the closed position (FIG. 9), the cowls 50 cover the turbine engine 3 so as to form an outer fairing of the intermediate section 11 of the nacelle 2.

In the open position (FIG. 10), the cowls 50 clear a space for access to the turbine engine 3.

In a manner known per se, each of the cowls 50 is movable between the closed and open positions, preferably under the action of a cylinder (not represented), in rotation about an axis defined by the corresponding pivot connection 51.

The invention relates more specifically to a system comprising one or more connecting rod(s) 55 intended to fill both a structural reinforcement function when the propulsion unit 1 is in a flight configuration, in which the cowls 50 are in the closed position, and a function of holding the cowls 50 in the open position when the propulsion unit 1 is in a maintenance configuration.

The propulsion unit 1 of FIG. 9 and next comprises two half-portions symmetrical with respect to each other and extending on either side of a longitudinal midplane which is parallel to a plane defined by the directions Y and X, i.e. in this case a vertical plane, passing through the longitudinal central axis A1 of the propulsion unit 1.

In a non-represented embodiment, the two half-portions are not symmetrical with respect to each other.

Each of these half-portions comprises a respective one amongst the cowls 50.

The following description relates to one of these half-portions—and consequently refers to only one of the two cowls 50—and applies by analogy to the other half-portion of the propulsion unit 1.

Figure 11:
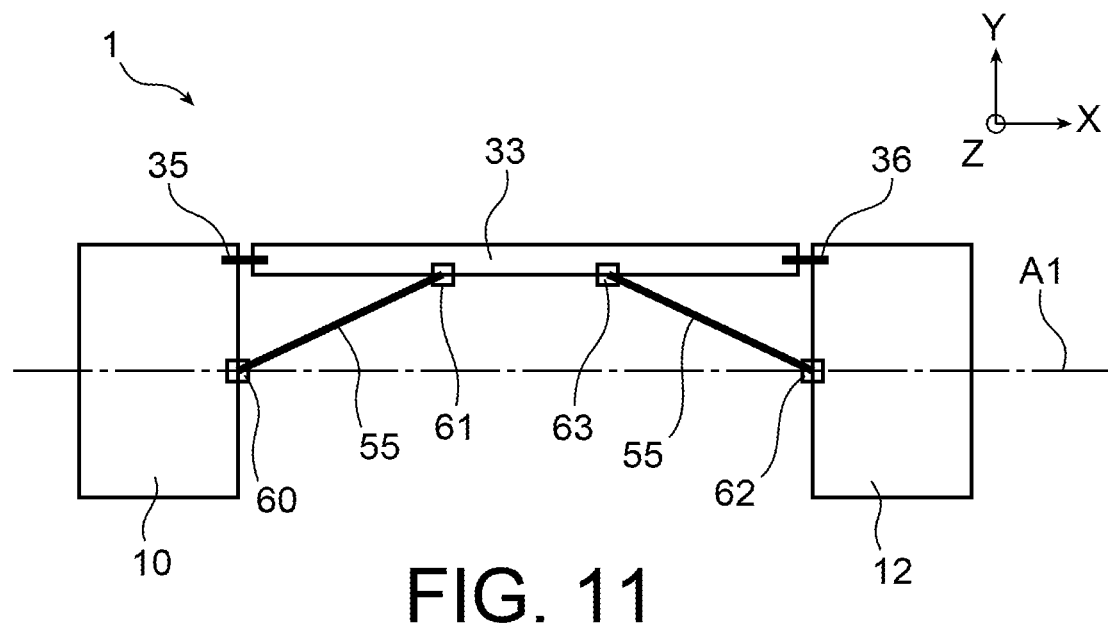
FIG. 11 is a schematic view of a propulsion unit having an architecture similar to that of FIG. 5, the propulsion unit comprising connecting rods in a flight position in which they ensure a structural reinforcement function for the nacelle.
Figure 12:
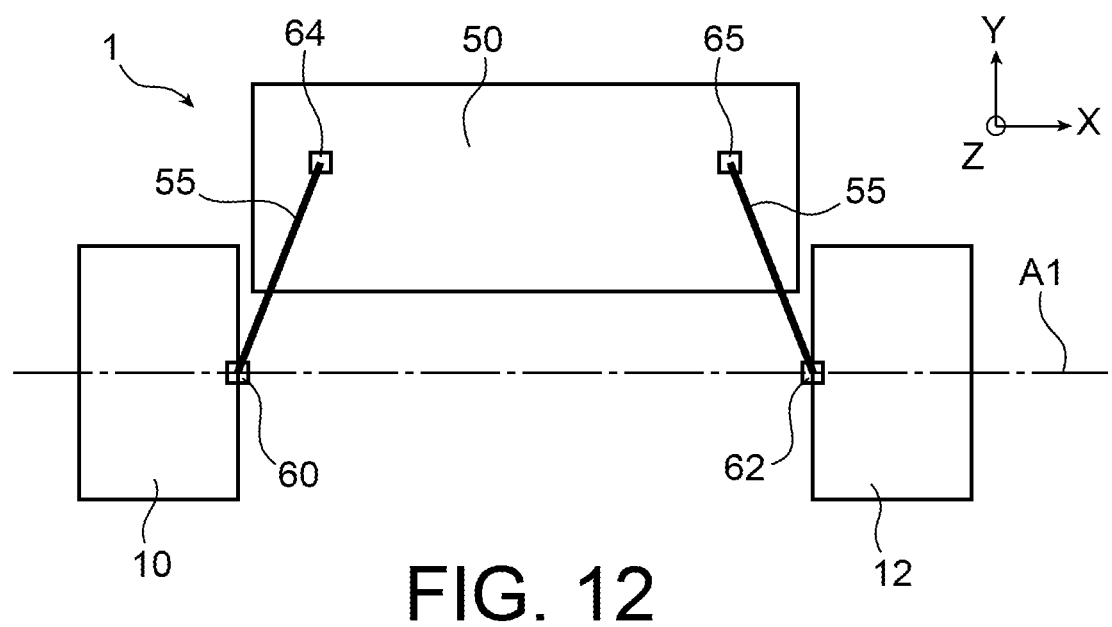
FIG. 12 is a schematic view of the propulsion unit of FIG. 11, the connecting rods being in a maintenance position in which they hold a fan cowl in an open position.

In the embodiment of FIGS. 11 and 12, the propulsion unit 1 has an architecture as illustrated in FIG. 5.

This propulsion unit 1 comprises two connecting rods 55.

In FIG. 11, the connecting rods 55 are in a flight position in which they are configured to fill a structural reinforcement function.

One of these connecting rods 55, so-called the "front connecting rod" (on the left in FIG. 11), comprises a first end connected to the air inlet 10 by a connecting means 60 and a second end connected to the intermediate support structure 33, in this example the cradle of FIG. 6, by a connecting means 61 also called "attachment means". The other connecting rod 55, so-called the "rear connecting rod" (on the right in FIG. 11), comprises a first end connected to the rear section 12 by a connecting means 62 and a second end connected to the cradle 33 by a connecting means 63 also called "attachment means".

The connecting rods 55 in the flight position extend obliquely with respect to the longitudinal X and vertical Y directions so that the front connecting rod could transmit forces between the air inlet 10 and the cradle 33 and the rear connecting rod between the rear section 12 and the cradle 33.

The connecting rods 55 are movable between the flight position of FIG. 11 and a maintenance position illustrated in FIG. 12.

In this example, the connecting means 60 connecting together the front connecting rod 55 and the air inlet 10 forms a pivot connection and the connecting means 61 forms a detachable connection allowing detaching the front connecting rod 55 and the cradle 33 from each other—the cradle 33 is visible in FIG. 11 but not in FIG. 12; conversely, the cowl 50 is visible in FIG. 12 but not in FIG. 11.

Similarly, the connecting means 62 connecting together the rear connecting rod 55 and the rear section 10 forms a pivot connection and the connecting means 63 forms a detachable connection allowing detaching the rear connecting rod 55 and the cradle 33 from each other.

In one embodiment, each of the connecting means 60 and 62 comprises a clevis (not represented) fastened on the air inlet 10 or the rear section 12, respectively, the connecting rods 55 comprising an axis (not represented) configured to cooperate with the corresponding clevis to form said pivot connection.

In this example, each of the connecting means 61 and 63 comprises at least one portion of a ball lock mechanism known as "quick-release pin" and allowing quickly connecting/detaching each of the connecting rods 55 and the cradle 33 with respect to each other.

Of course, the connecting means 61 and 63 may comprise any other locking-unlocking mechanism, including a screw-nut type mechanism if the duration of the maintenance interventions is not very constraining in the considered applications.

To switch from the flight position (FIG. 11) into the maintenance position (FIG. 12), the connecting rods 55 are manually separated from the cradle 33 then moved relative to the cradle 33 according to their respective pivot connection 60 or 62.

Referring to FIG. 12, the cowl 50 comprises two connecting means 64 and 65 each configured to cooperate with the second end of a respective one amongst the connecting rods 55 when these are in the maintenance position.

The connecting means 64 and 65 are similar to the connecting means 61 and 63 and therefore comprise, in this example, at least one portion of a ball lock mechanism allowing quickly connecting/detaching each of the connecting rods 55 and the cowl 50 with respect to each other.

Of course, the ball lock mechanism may be replaced by another locking means (not represented).

The connecting rods 55 in the maintenance position are configured to fill a function of holding the cowl 50 in the open position.

To switch from the maintenance position (FIG. 12) into the flight position (FIG. 11), the connecting rods 55 are manually detached from the cowl 50 then moved relative to the cradle 33 according to their respective pivot connection 60 or 62.

Consequently, the connecting rods 55 in the flight position are detached from the cowl 50 and cooperate with the air inlet 10, the rear section 12 and the cradle 33 whereas, in the maintenance position, they are detached from the cradle 33 and cooperate with the air inlet 10, the rear section 12 and the cowl 50.

In order to carry out an inspection and/or maintenance operation on the propulsion unit 1 starting from a flight configuration in which the cowl 50 is in the closed position and in which the connecting rods 55 are in the flight position, the cowl 50 is moved from the closed position to the open position then the connecting rods 55 are moved from the flight position to the maintenance position.

Conversely, to replace the propulsion unit 1 in the flight configuration, the connecting rods are moved from the maintenance position to the flight position then the cowl 50 is moved from the open position to the closed position.

The invention encompasses many variants or alternatives to the embodiments that have just been described.

For example, the pivot connection formed by the connecting means 60 and 62 may be replaced by a ball-joint connection.

Moreover, either one or both of the connecting rods 55 may be detachable on both sides.

Figure 13:
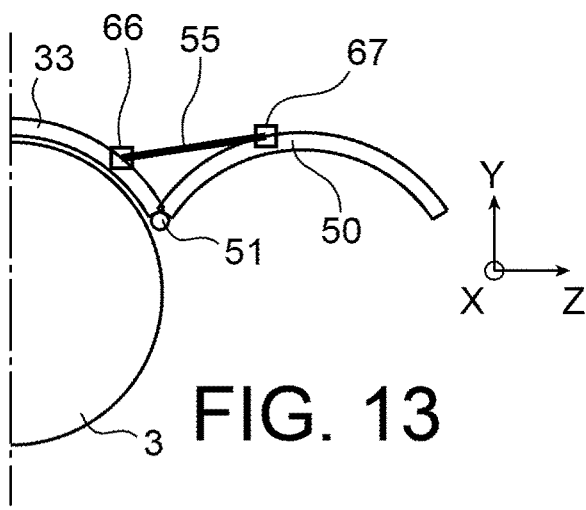
FIG. 13 is a schematic view of the propulsion unit of FIG. 10, comprising a connecting rod in the maintenance position connected to the cradle and to one of the cowls.

Thus, both of the connecting means 60 and 61 of FIG. 11 may be of the detachable type and, with reference to FIG. 13, each of the intermediate support structure 33 and the cowl 50 may comprise a corresponding detachable connecting means 66 and 67, respectively.

In this example, in the flight position (FIG. 11), the front connecting rod 55 cooperates with the air inlet 10 and the cradle 33 via the connecting means 60 and 61, respectively, and is detached from the cowl 50. In the maintenance position (FIG. 13), the front connecting rod 55 is detached from the air inlet 10 and cooperates with the cradle 33 and the cowl 50 via the connecting means 66 and 67, respectively, so as to hold the cowl in the open position.

Figure 14:
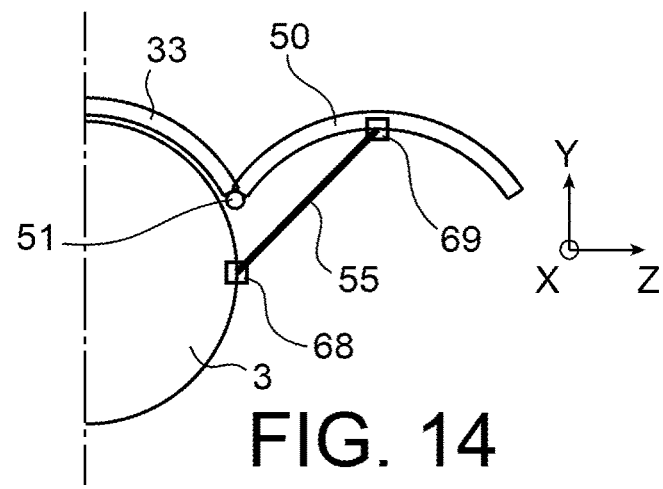
FIG. 14 is a schematic view of the propulsion unit of FIG. 10, comprising a connecting rod in the maintenance position connected to a turbine engine and to one of the cowls.

In the example of FIG. 14, each of the turbine engine 3 and the cowl 50 comprises a connecting means 66 and 69, respectively, of the detachable type so that, in the maintenance position, the front connecting rod 55 is detached from the air inlet 10 and cooperates with the turbine engine 3 and the cowl 50 via the connecting means 68 and 69, respectively, so as to hold the cowl 50 in the open position.

What has just been described with reference to FIGS. 13 and 14 may be applied in the same manner to the rear connecting rod 55 of FIG. 11.

The connecting rods 55 have any geometry adapted to the architecture of the propulsion unit 1, for example a straight or curved shape so as to match, for example, with the contours of the turbine engine 3.

The connecting rods 55 may be telescopic so as to have a different length in the flight position and in the maintenance position.

The number of connecting rods 55 may be adapted according to the dimensions and the architecture of the propulsion unit 1 as well as the effective loads to which they should be subjected.

For example, in the case where the rear section 12 does not comprise a thrust reverser, only the front connecting rod can be implemented. Indeed, the absence of a thrust reverser allows reducing the mechanical stresses and, in this example, dispensing with the rear connecting rod.

The embodiments described hereinabove with reference to FIGS. 9 to 14 are particularly suitable for a configuration of a propulsion unit 1 as illustrated in FIGS. 2 and 3. They may also be implemented in a configuration as illustrated in FIG. 4.

Figure 15:
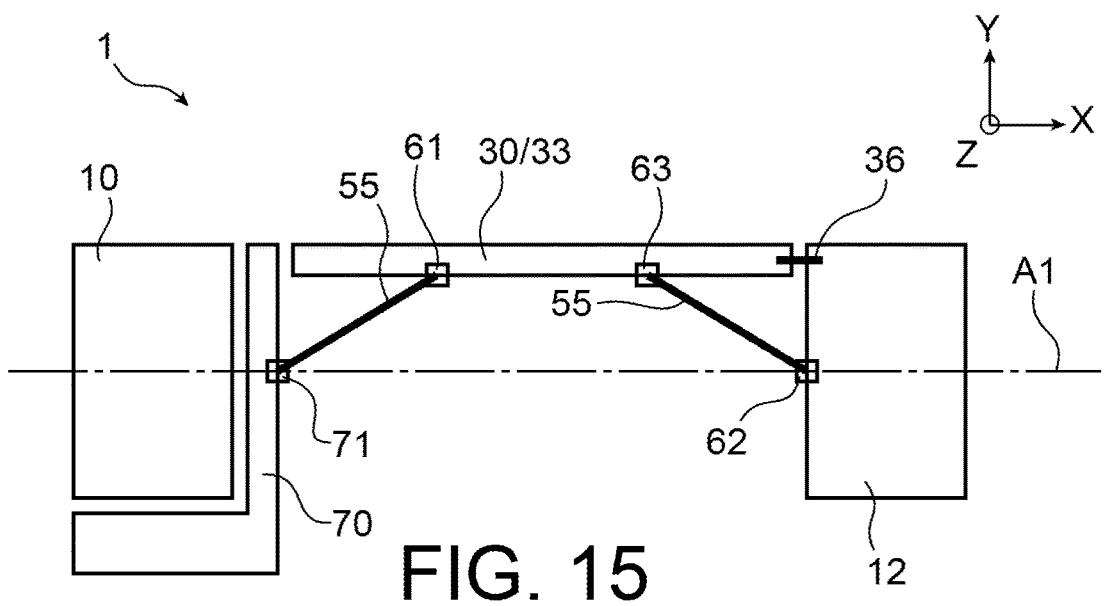
FIG. 15 is a schematic view of a propulsion unit comprising connecting rods in the flight position.

FIG. 15 shows another type of an architecture of a propulsion unit 1 particularly suitable, yet in no way limited, to a mounting in accordance with FIG. 4.

In comparison with FIG. 11, the propulsion unit 1 of FIG. 15 comprises a front connecting rod 55 cooperating in the flight position not with the air inlet 10 but with a structure 70 forming in this example a portion of the fuselage 21 of the aircraft. The structure 70 comprises a connecting means 71 similar to the connecting means 60 of FIG. 11.

In all of the above-described examples, the connecting rod(s) 55 can cooperate in the flight position not with the intermediate support structure 33 of an architecture in accordance with FIG. 5 but with a support structure 30 which may form a wing or fuselage or empennage element of the aircraft.

For example, in the particular case of FIG. 15, the connecting means 61 and 63 may be arranged so that the connecting rods 55 in the flight position cooperate with a support structure 30 forming a portion of the empennage 22 of the aircraft.

What is claimed is:

1. A nacelle for an aircraft propulsion unit, comprising:
    at least one cowl movable between a closed position and an open position;
    at least one first movable connecting rod and at least one second movable connecting rod, configured to fill:
        a first structural reinforcement function when the at least one first movable connecting rod and the at least one second movable connecting rod are placed in a flight position, wherein the at least one first movable connecting rod in the flight position is configured to connect an air inlet of the nacelle and a cradle of the nacelle and transmit forces between the air inlet of the nacelle and the cradle of the nacelle and the at least one second movable connecting rod in the flight position is configured to connect a gas ejection rear section to the cradle and transmit forces between the gas ejection rear section and the cradle, and
        a second holding function when the at least one first movable connecting rod and the at least one second movable connecting rod are placed in a maintenance position, the at least one first movable connecting rod and the at least one second movable connecting rod in the maintenance position hold the at least one cowl in the open position,
    wherein the at least one cowl comprises connecting means configured to cooperate with the at least one first movable connecting rod and the at least one second movable connecting rod in the maintenance position, and the at least one first movable connecting rod and the at least one second movable connecting rod in the flight position are detached from the connecting means; and
    wherein the cradle extends longitudinally between the air inlet and the gas ejection rear section and supports the air inlet and/or the gas ejection rear section, the cradle comprising attachment means configured to cooperate with the at least one first movable connecting rod and the at least one second movable connecting rod in the flight position, and the at least one first movable connecting rod and the at least one second movable connecting rod in the maintenance position are detached from the attachment means.

2. A propulsion unit for an aircraft, comprising:
    a turbine engine; and
    the nacelle according to claim 1.

3. The propulsion unit according to claim 2, wherein the at least one first movable connecting rod and the at least one second connecting rod in the maintenance position are fastened to the turbine engine.

4. An aircraft comprising the propulsion unit according to claim 2.

5. A method for inspecting and/or maintaining the propulsion unit according to claim 2, comprising:
    a step of moving the cowl from the closed position to the open position; and
    a step of moving the at least one first movable connecting rod and the at least one second movable connecting rod from the flight position to the maintenance position.

* * * * *